United States Patent
Atkins et al.

(10) Patent No.: US 10,445,703 B1
(45) Date of Patent: Oct. 15, 2019

(54) EARLY ENOUGH REMINDERS

(75) Inventors: Richard J. Atkins, Chatswood (AU); Sunny Singh Kalsi, Macquarie Fields (AU); Rohan Lenard, Sydney (AU); David Thambiratnam, Ashfield (AU); Douglas W. Swartz, Lakewood, CO (US)

(73) Assignee: Avaya Inc., Basking Ridge, NJ (US)

( * ) Notice: Subject to any disclaimer, the term of this patent is extended or adjusted under 35 U.S.C. 154(b) by 2257 days.

(21) Appl. No.: 11/554,478

(22) Filed: Oct. 30, 2006

(51) Int. Cl.
*G06Q 10/10* (2012.01)
*H04L 29/08* (2006.01)
*H04M 1/725* (2006.01)

(52) U.S. Cl.
CPC ....... *G06Q 10/1093* (2013.01); *G06Q 10/109* (2013.01); *H04L 67/24* (2013.01); *H04M 1/72566* (2013.01)

(58) Field of Classification Search
CPC .................................................. G06Q 10/109
See application file for complete search history.

(56) References Cited

U.S. PATENT DOCUMENTS

| | | |
|---|---|---|
| 4,819,191 A | 4/1989 | Scully et al. |
| 4,831,552 A | 5/1989 | Scully et al. |
| 5,050,077 A | 9/1991 | Vincent |
| 5,124,912 A | 6/1992 | Hotaling et al. |
| 5,197,000 A | 3/1993 | Vincent |
| 5,206,903 A | 4/1993 | Kohler et al. |
| 5,216,603 A | 6/1993 | Flores et al. |
| 5,323,314 A | 6/1994 | Baber et al. |
| 5,428,784 A | 6/1995 | Cahill, Jr. |
| 5,555,346 A | 9/1996 | Gross et al. |
| 5,619,555 A | 4/1997 | Fenton et al. |
| 5,627,978 A | 5/1997 | Altom et al. |
| 5,774,867 A | 6/1998 | Fitzpatrick et al. |
| 5,793,365 A | 8/1998 | Tang et al. |
| 5,813,013 A | 9/1998 | Shakib et al. |
| 5,828,747 A | 10/1998 | Fisher et al. |
| 5,889,945 A | 3/1999 | Porter et al. |
| 5,893,073 A | 4/1999 | Kasso et al. |
| 5,905,793 A | 5/1999 | Flockhart et al. |

(Continued)

FOREIGN PATENT DOCUMENTS

| | | |
|---|---|---|
| EP | 1014286 | 6/2000 |
| EP | 1560138 | 8/2005 |
| WO | WO 05/010715 | 2/2005 |

OTHER PUBLICATIONS

IBM TBD, Salahshour et al., "Mechanism for Automatic Adjustment to the date and time event reminder," IPCOM000104264D, Research Disclosure n347 Mar. 1993, orig. pub. Mar. 1, 1993, IP electronic pub. Mar. 19, 2005.*

(Continued)

*Primary Examiner* — Abhishek Vyas
(74) *Attorney, Agent, or Firm* — Sheridan Ross P.C.

(57) ABSTRACT

The present invention provides methods and systems for preparing reminders for calendar items (i.e., tasks). More specifically, a calendar item may be created using a calendar application or the like. Once created the reminder is strategically scheduled to provide the reminder to the user associated with the calendar item early enough such that the user can be reminded in a convenient and helpful manner, and will have a chance to perform any necessary tasks prior to the calendar item.

19 Claims, 9 Drawing Sheets

(56) References Cited

U.S. PATENT DOCUMENTS

| | | | |
|---|---|---|---|
| 5,920,701 A | 7/1999 | Miller et al. |
| 5,960,406 A | 9/1999 | Rasansky et al. |
| 5,963,913 A | 10/1999 | Henneuse et al. |
| 5,982,873 A | 11/1999 | Flockhart et al. |
| 6,064,976 A | 5/2000 | Tolopka |
| 6,085,166 A | 7/2000 | Beckhardt et al. |
| 6,101,480 A | 8/2000 | Conmy et al. |
| 6,147,685 A | 11/2000 | Bliss et al. |
| 6,163,607 A | 12/2000 | Bogart et al. |
| 6,173,053 B1 | 1/2001 | Bogart et al. |
| 6,192,111 B1 | 2/2001 | Wu |
| 6,192,122 B1 | 2/2001 | Flockhart et al. |
| 6,272,074 B1 | 8/2001 | Winner |
| 6,360,217 B1 | 3/2002 | Gopal et al. |
| 6,363,352 B1 | 3/2002 | Dailey et al. |
| 6,377,965 B1 | 4/2002 | Hachamovitch et al. |
| 6,434,571 B1 | 8/2002 | Nolte |
| 6,570,555 B1 | 5/2003 | Prevost et al. |
| 6,594,637 B1 | 7/2003 | Furukawa et al. |
| 6,640,230 B1 | 10/2003 | Alexander et al. |
| 6,662,309 B2 | 12/2003 | Ando et al. |
| 6,675,356 B1 | 1/2004 | Adler et al. |
| 6,694,335 B1 | 2/2004 | Hopmann et al. |
| 6,731,323 B2 | 5/2004 | Doss et al. |
| 6,988,128 B1 | 1/2006 | Alexander et al. |
| 7,007,235 B1 | 2/2006 | Hussein et al. |
| 7,016,909 B2 | 3/2006 | Chan et al. |
| 7,027,995 B2 | 4/2006 | Kaufman et al. |
| 7,035,865 B2 | 4/2006 | Doss et al. |
| 7,065,184 B2 * | 6/2006 | Vishik ............... G06F 21/32 379/201.06 |
| 7,082,402 B2 | 7/2006 | Conmy et al. |
| 7,113,797 B2 | 9/2006 | Kelley et al. |
| 7,130,885 B2 | 10/2006 | Chandra et al. |
| 7,149,810 B1 | 12/2006 | Miller et al. |
| 7,155,435 B1 | 12/2006 | Day et al. |
| 7,187,384 B2 | 3/2007 | Noyle |
| 7,188,073 B1 | 3/2007 | Tam et al. |
| 7,246,371 B2 * | 7/2007 | Diacakis ........... G06Q 10/087 709/204 |
| 7,254,569 B2 | 8/2007 | Goodman et al. |
| 7,334,000 B2 * | 2/2008 | Chhatrapati ........ G06Q 10/06 |
| 7,343,312 B2 | 3/2008 | Capek et al. |
| 7,343,313 B2 | 3/2008 | Dorenbosch et al. |
| 7,353,466 B2 * | 4/2008 | Crane et al. ............... 715/752 |
| 7,363,590 B2 | 4/2008 | Kerr et al. |
| 7,383,291 B2 | 6/2008 | Guiheneuf et al. |
| 7,383,303 B1 | 6/2008 | Bort |
| 7,395,221 B2 | 7/2008 | Doss et al. |
| 7,436,654 B2 | 10/2008 | Cho |
| 7,440,961 B1 | 10/2008 | Matousek |
| 7,519,672 B2 | 4/2009 | Boss et al. |
| 7,595,717 B2 * | 9/2009 | Boss et al. ............. 340/309.16 |
| 7,693,734 B2 | 4/2010 | Christenson et al. |
| 7,774,221 B2 * | 8/2010 | Miller ............... G06Q 10/00 705/7.19 |
| 7,822,628 B2 * | 10/2010 | Brady ............ G06Q 10/0631 705/7.13 |
| 2001/0054072 A1 | 12/2001 | Discolo et al. |
| 2002/0085701 A1 | 7/2002 | Parsons et al. |
| 2002/0117847 A1 | 8/2002 | Ede et al. |
| 2002/0120600 A1 | 8/2002 | Schiavone et al. |
| 2002/0144136 A1 | 10/2002 | Stornetta et al. |
| 2003/0046304 A1 | 3/2003 | Peskin et al. |
| 2003/0069880 A1 | 4/2003 | Harrison et al. |
| 2003/0149606 A1 | 8/2003 | Cragun et al. |
| 2003/0154293 A1 | 8/2003 | Zmolek |
| 2003/0163537 A1 | 8/2003 | Rohall et al. |
| 2004/0054726 A1 | 3/2004 | Doss et al. |
| 2004/0128181 A1 | 7/2004 | Zurko et al. |
| 2004/0168133 A1 | 8/2004 | Wynn et al. |
| 2004/0192857 A1 | 9/2004 | Borer et al. |
| 2004/0199663 A1 | 10/2004 | Horvitz et al. |
| 2004/0249776 A1 * | 12/2004 | Horvitz ............. G06Q 10/109 706/21 |
| 2004/0254998 A1 | 12/2004 | Horvitz |
| 2005/0069099 A1 | 3/2005 | Kozdon et al. |
| 2005/0125246 A1 | 6/2005 | Muller et al. |
| 2005/0125248 A1 | 6/2005 | Butterworth et al. |
| 2005/0165631 A1 | 7/2005 | Horvitz |
| 2005/0171818 A1 * | 8/2005 | McLaughlin ................ 705/3 |
| 2005/0192857 A1 | 9/2005 | Levine |
| 2005/0198144 A1 | 9/2005 | Kraenzel et al. |
| 2005/0273493 A1 * | 12/2005 | Buford et al. ............. 709/204 |
| 2006/0004843 A1 | 1/2006 | Tafoya et al. |
| 2006/0020889 A1 | 1/2006 | Coppinger et al. |
| 2006/0031326 A1 | 2/2006 | Ovenden |
| 2006/0031470 A1 | 2/2006 | Chen et al. |
| 2006/0047557 A1 | 3/2006 | Bieselin et al. |
| 2006/0069686 A1 | 3/2006 | Beyda et al. |
| 2006/0184584 A1 | 8/2006 | Dunn et al. |
| 2006/0190485 A1 | 8/2006 | Adams et al. |
| 2006/0212330 A1 * | 9/2006 | Savilampi ................... 705/8 |
| 2006/0218029 A1 * | 9/2006 | Chin .................. G06Q 10/109 705/80 |
| 2006/0242109 A1 | 10/2006 | Pereira et al. |
| 2007/0016878 A1 | 1/2007 | Forlenza et al. |
| 2007/0118415 A1 | 5/2007 | Chen et al. |
| 2007/0174104 A1 | 7/2007 | O'Sullivan et al. |
| 2007/0265903 A1 | 11/2007 | Blair et al. |
| 2008/0005685 A1 | 1/2008 | Drews et al. |
| 2008/0034425 A1 | 2/2008 | Overcash et al. |
| 2008/0037733 A1 | 2/2008 | Chen et al. |

OTHER PUBLICATIONS

U.S. Appl. No. 12/570,933, filed Sep. 30, 2009, Mohler.
Avaya Case Study (Advertising Agency Uses Avaya Unified Messenger to Streamline Communications, 2003 Avaya Inc.), 2 pages.
Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03, Jan. 27, 2003), 4 pages.
Avaya Unified Messenger Client User Guide (2002 Avaya Inc.)
Avaya Web Pages (Retrieved Archive.org from Jun. 13, 2004), 167 pages.
Avaya Unified Messenger Solution—Microsoft Exange 2000 version Installation Guide (2002 Avaya Inc.) 164 pages.
Avaya Unified Messenger Solution—Microsoft Exange Version, 2000 version (2002 Avaya Inc), 8 pages.
Online Training Solutions, Inc., "Step by Step," Microsoft Outlook 2003, pp. 1-119, USA.
Boyce, "Microsoft Office Outlook 2003 Inside Out," Nov. 5, 2003, Microsoft Press, Chapter 2.
U.S. Appl. No. 10/770,640, filed Feb. 2, 2004, Mohler.
U.S. Appl. No. 11/350,050, filed Feb. 7, 2006, Atkins et al.
U.S. Appl. No. 11/488,487, filed Jul. 17, 2006, Daily et al.
U.S. Appl. No. 11/554,442, filed Oct. 30, 2006, Atkins et al.
U.S. Appl. No. 11/554,497, filed Oct. 30, 2006, Chu et al.
U.S. Appl. No. 11/619,145, filed Jan. 2, 2007, Atkins et al.
U.S. Appl. No. 11/669,707, filed Jan. 31, 2007, Blair et al.
"Avaya™ Unified Communication Center (UCC) Speech Access Solution", Avaya, Inc. (2002), 4 pages.
"How to Use a TTY", NETAC Teacher Tipsheet, htt://72.14.203.104/search?q=cache:JdktLkxPgMUJ:www.netac.rit.edu/downloads/TPSHT_TTY.pdf+%22teletypewriter%22+ . . . (1999) 4 pages.
"Meetings in America", MCI Conferencing, available at http://e-meetings.mci.com/meetingsinamerica/uswhitepaper.php3, website updated Aug. 19, 2003, pp. 1-12.
"TTY Brochure Feb. 2006", http://72.14.203.104/search?q=cache:O3tW0eQtbTEF:ods.utk.edu/brochures/TTYBrochureFebruary2006.pdf+%22teletypewrite . . . (Feb. 2006) 3 page.
"WebAccess Client User Guide" Novell GroupWise 6.5, Oct. 31, 2005, 68 pages.
AIM Acronym Dictionary, http://www.aim.com/acronyms.adp (Jan. 16, 2007) 7 pages.
AIM Bots, http://developer.aim.com/botMain.jsp (2006) 2 pages.
AIM Buddy Info, http://buddyinfo.aim.com/ (2006) 2 pages.

(56) References Cited

OTHER PUBLICATIONS

AIM Presence Services, http://developer.aim.com/presenceMain.jsp (2006) 2 pages.
Arthur M. Rosenberg and David A. Zimmer, "Beyond VoIP: Enterprise Perspectives on Migrating to Multi-Modal Communications and Wireless Mobility", (Oct. 2004) 38 pages.
Arthur M. Rosenberg and David A. Zimmer, "Migrating to Enterprise-Wide Communications: The Branch Office Dilemma", May 2003, 14 pages.
Avaya by Example; Three-Week Wonder: Avaya Unified Communication Center Speech Access Gives Road Warriors 15 Additional Days Each Year, Avaya, Inc. (2005) 3 page.
Boyce, "Microsoft Office Outlook 2003 Inside Out," Nov. 5, 2003, Microsoft Press, Chapters 1, 19, 20.
Chapters 4, 5 and 7 from Microsoft® Office Outlook® 2003; "Step by Step"; Online Training Solutions, Inc.
Dave Anderson and George McNeill, "Artificial Neural Networks Technology", http://www.dacs.dtic.mil/techs/dacs_reports/text/neural_nets.txt (Aug. 20, 1992) 145 pages.
"Microsoft Outlook" http://en.wikipedia.org/wiki/Microsoft_Outlook; printed Mar. 14, 2006; 4 pages.
"FreeBusy—Microsoft Outlook email autoresponder" http://freebusy.4team.biz/; printed May 24, 2006; 4 pages.
"Microsoft Outlook in Your Small Business" http://www.bcentral.co.uk/products/microsoft-outlook.mspx; printed Mar. 14, 2006; 2 pages.
http://www.effectivemeetings.com (SMART Technologies, Inc., May 2003).
Ivtta Turin 98, "The Linguistic Components of the Reward Dialogue Creation Environment and Run Time System", http://cpk.auc.dk/~tb/articles/ivtta98.htm (Sep. 1998) 13 pages.
Rob Kassel, "How Speech Recognition Works", http://www.microsoft.com/speech/docs/How_Speech_Works_Article.htm (Nov. 30, 2004) 4 pages.
Tony Vitale, "Hardware and Software Aspects of a Speech Synthesizer Developed for Persons With Disabilities", http://codi.buffalo.edu/archives/computing/.dec.speech (1993).
Yin "[Design] linking and grouping items", available at http://lists.osafoundation.org/pipermail/design/2005-August/003159.html Aug. 1, 2005, pp. 1-2.
Background of the above-captioned application (previously provided).
Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.
Clayton, Brad "Microsoft Outlook 2003 Enhancements", modified Apr. 19, 2004, Purdue University, 4 pages.
Avantgo: AvantGo launches new release of Pylon products; AvantGo Pylon 5.1 offers new support for Domino 6, Palm OS 5 and custom repeating meetings M2 Presswire. Coventry: Jan 24, 2003. p. 1-4.
"Special Edition Using Lotus Notes and Domino 5" (Published by Que, Aug. 23, 1999, ISBN 0-7897-1814-6.
"Windows Client User Guide" (Novell Groupwise 7.0, Mar. 14, 2008, copyright 2005-2008) discloses Groupwise 7.0 (released Aug. 15, 2005), 389 pages.
Raider, "Make Address Book Smart Groups auto-complete in mail," MacOsHints.com, contributed Jun. 29, 2005, pp. 1-4.
"Products: Groove Virtual Office," groove.com, 2005, retrieved Mar. 11, 2011, http://replay.waybackmachine.org/2005041 901 0213/http://www.groove.netiindex.cfm/pagenamelVirtualOffice/, 2 pages.
"Competitive analysis of collaboration tools," http://www.hcii.cmu.edu/M-HCI/2004/sun/competition.htm, 2004, retrieved Mar. 11, 2011, 6 pages.

* cited by examiner

EARLY ENOUGH REMINDERS

FIELD OF THE INVENTION

The invention relates generally to calendars and scheduling applications. More particularly, the invention relates to reminders associated with tasks made using such applications.

BACKGROUND

Electronic mail has become a widely used business communication and organization application. The use of email has proliferated well beyond the simple act of sending and receiving messages. Email is currently used as a platform for meeting coordination and resource sharing. Additionally, applications like electronic calendars and planners are widely used alone and with email. There are a number and variety of interactive electronic calendaring systems and methods currently available to email users. The objective of all of these systems is primarily to assist the person who, for a number of different reasons, maintains a calendar of future events containing various information about the events at entry points on the calendar, which relate to the time of the event. The events (or calendar items) have a number of different parameters (e.g., location, time, resources, attendees, invitees, etc.) that help define the event.

The increased availability and usefulness of personal computers, Personal Digital Assistants (PDAs) and intelligent workstations in recent years has made it possible for calendar owners to establish and maintain these calendars on these interactive type data processing systems. Hence, the term "electronic calendaring systems."

It is common to organize meetings via an electronic calendaring system, and the meeting organizer can set a reminder to display an alarm for a predefined period of timer prior to beginning of the meeting. An electronic calendar user may also create to-do tasks for him/herself that also include a reminder that displays such an alarm to remind the user to do the task. Sometimes these reminders are useless. Consider, for example, a 1:00 pm meeting may have the meeting reminder set to go off at 12:45 pm, fifteen minutes prior to the beginning of the meeting. However if the user is out to lunch between the hours of 12:00 pm and 1:00 pm, the user will likely not receive the reminder in time to prepare for, or even make it to, the meeting promptly. Alternatively, the reminder may go off at a time when the user is already in another meeting, thus preventing the user from timely receiving the reminder. Another situation that may exist is that the meeting may be set for the first thing in the user's work morning, say for example 8:00 am. For this particular situation a 7:45 am reminder will not serve the user very well as the default fifteen minute reminder may not give the user enough time to travel from home to work.

There have been some attempts to address this particular problem. For instance, some calendar applications allow a meeting organizer to manually customize the meeting reminder such that it "goes off" at a more appropriate time. In a more complicated situation, each invitee to the meeting can manually customize their individual reminders themselves. This particular solution can be useful if the user is customizing only one meeting and has only one meeting in a given day. However, manually customizing reminder times can quickly become confusing and arduous if the user has several meetings in a given day and some of those meetings are back-to-back. Several other meetings and other tasks may affect the scheduling of one reminder. Moreover, the addition of a new meeting to a schedule may have a ripple effect on the already customized reminders of other meetings occurring that day. Thus, if the user adds one meeting to an already busy schedule, the user will be required to go back and manually customize every other meeting reminder for that day to ensure all reminders go off at the appropriate time.

A further complication can arise if a meeting is cancelled in a busy schedule. Under such a circumstance, some meeting reminders may now be in improper locations because their former location depended upon the other meeting occurring. With the meeting being canceled a similar ripple effect will require the user to manually customize and check each reminder of all other meetings and tasks, which as noted before can be a time consuming task for someone with a busy schedule.

Another solution would be to carry a communication device that provides reminders for meetings and/or tasks in a user's calendar. This particular solution is good in some cases as it is able to follow a particular user and does not depend on the user being in a particular location. However, this solution has several downsides as well. One downside is that the user is required to carry the communication device at all times and have that device on at all times. If the user does not have the device or the device has failed then the user will most assuredly not receive the reminder in a timely fashion. A second drawback is that if the user has back-to-back meetings it may not do the user any good to receive a reminder of the next meeting while the user is currently in another meeting. This may be especially true if the user needed to pick up some resource such as a computer or projector prior to going to the next meeting or if the next meeting is at a different location. If the user receives the reminder while in the first meeting the reminder may be of little use.

SUMMARY

These and other needs are addressed by various embodiments and configurations of the present invention. The present invention is directed generally to intelligent scheduling of a reminder for a calendar item or task. More specifically, reminders are scheduled early enough such that they are useful to the user receiving the reminder.

In accordance with one embodiment of the present invention, a method is provided. The method comprises the steps of:

(a) creating a first calendar item for a user;
(b) analyzing a schedule associated with the user;
(c) determining whether the first calendar item substantially immediately precedes a second calendar item; and
(d) in the event that the first calendar item substantially immediately precedes the second calendar item, providing the user with an option of scheduling a first reminder for the second calendar item prior to the first calendar item.

As used herein a "calendar item" is understood to include a temporally scheduled to-do item including, without limitation, schedules, meetings or requests thereof, events, and tasks. A calendar item may be used as a coordination of activities between two or more individuals or may alternatively be used as a task for one's self. Additionally, a calendar item may correspond to a time during which a user will not be able to receive reminders (e.g., non-working hours, holidays, weekends, lunch breaks, etc.).

When a new calendar item is created or added to a schedule that already contains other calendar items, that new calendar item may affect certain reminders for the already existing calendar items. Likewise, the placement of the reminder for the new calendar item may depend upon the timing, location, and other factors relating to the existing calendar items. Therefore, in accordance with at least one embodiment of the present invention, the existing schedule along with the exiting calendar items contained therein is analyzed when a new calendar item is added to the schedule. During the analysis of the existing schedule it can be determined whether an existing calendar item substantially immediately precedes or succeeds the added calendar item. If such a situation exists, then the default reminder time for the added calendar item may be adjusted, either manually or automatically, to accommodate for the existing schedule.

In one embodiment, the reminder for the added calendar item is scheduled such that it can be presented to the user at a time that is convenient and helpful to the user. In other words, the reminder for the added calendar item can be placed before any calendar item that substantially immediately precedes the added calendar item. This way the user can receive the reminder before the preceding calendar item and will be able to prepare not only for the first calendar item (if necessary), but will also be able to prepare for the added calendar item, if preparation is necessary.

In accordance with another embodiment of the present invention, reminders for calendar items can be adjusted, either manually or automatically, when a calendar item is removed from a schedule. If a calendar item is removed from a schedule it will likely have the same ripple effect on other reminders associated with other calendar items. For example, if the removed calendar item was scheduled to occur substantially immediately prior to another calendar item and the reminder for the second calendar item was set to occur prior to the scheduled beginning of the removed calendar item, then the reminder for the second, still remaining, calendar item may be scheduled too early. Thus, in accordance with embodiments of the present invention, when the preceding calendar item is removed from the schedule, the reminder for any calendar item substantially immediately following the removed calendar item can be pushed back to a more useful time (i.e., just prior to the later calendar item).

The adjustment of calendar item reminders, in one embodiment, is automated such that a user does not need to consume a large amount of time maintaining their schedule. Rather, with a little knowledge about a user's schedule and habits, reminders can be scheduled to occur early enough for a particular user to be useful. In other words, reminders can be scheduled to suit a particular user's schedule and work habits. These work habits can be provided to the schedule management system directly by the user or may be inferred by the schedule management system by observing the behavior of the user.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to provide customized reminders for calendar items.

Figure 1:
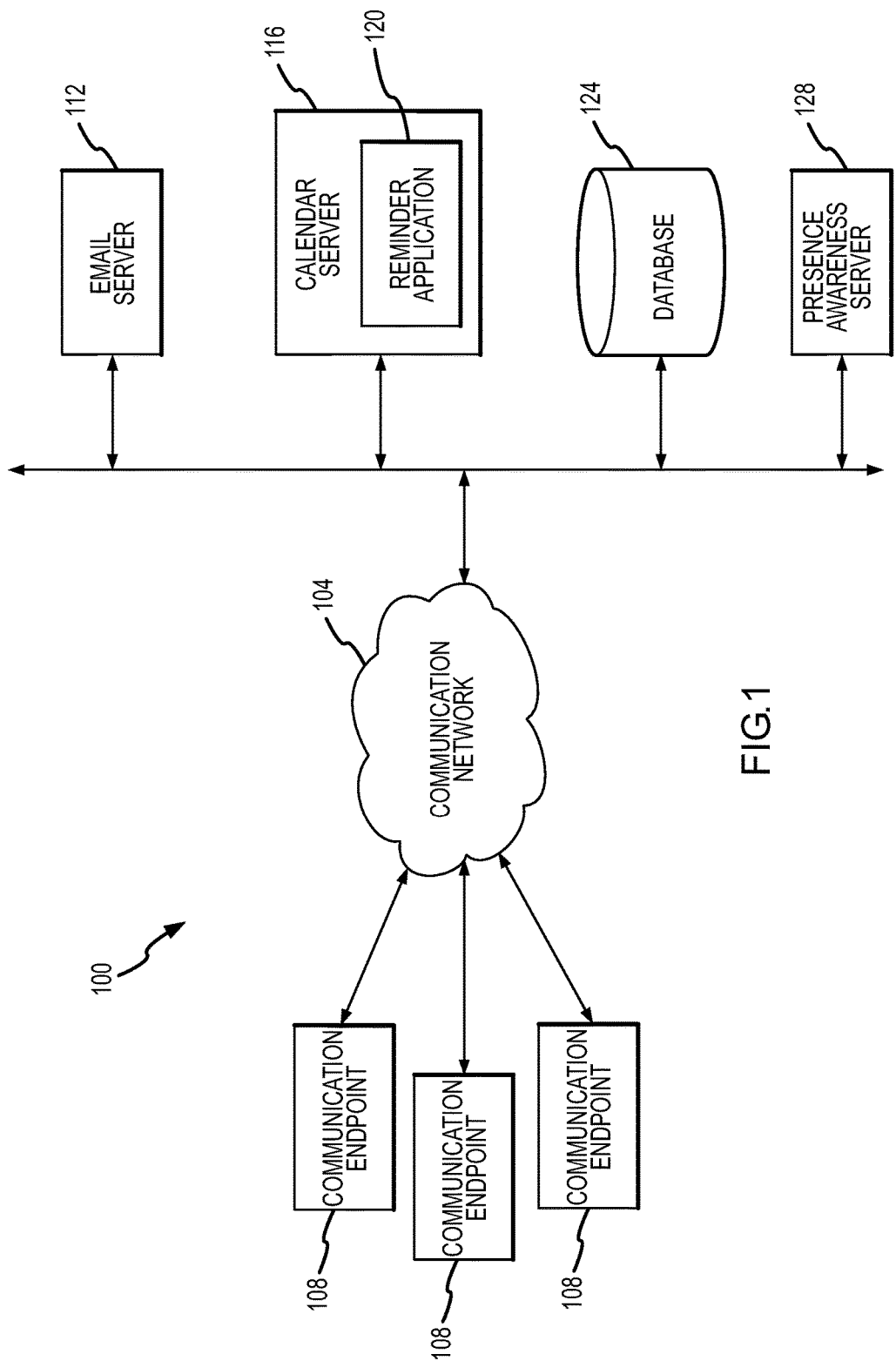
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication endpoints 108, an email server 112, a calendar server 116 having a reminder application 120, a database 124, and a presence awareness server 128.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN) like the Internet, and any other type of packet-switched or circuit-switched network known in the art. In addition, it can be appreciated that the communication network 104 need not be limited to any one network type, and instead may be comprised of a number of different networks and/or network types.

The communication endpoints 108 may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, Personal Digital Assistants (PDAs), and the like.

A server 112, 116, in accordance with embodiments of the present invention, may comprise a communication server or other dedicated processor that functions to provide services to client devices (e.g., communication endpoints 108). The electronic mail (email) server 112, in one embodiment, provides email capabilities to users of the communication endpoints 108. By accessing the email server 112, the communication endpoint 108 can view email that has been sent to a particular user associated with the communication endpoint 108.

The calendar server 116 may work in conjunction with the email server 112 to provide scheduling and resource management capabilities to the communication devices 108. The email server 112 may access applications on the calendar server, like the reminder application 120, to perform scheduling functions and to provide reminders to users via email. For example, a calendar service may be provided via an email application stored on the email server 112. Information related to the calendar service may be retrieved from the calendar server 116 and presented to the user through an email application. In one embodiment, calendar items may be generated by one user and transmitted to various other users of the communication endpoints 108 via email. Often a calendar item relates to a user's time commitment and/or obligations such as tasks, meetings, time off, and so on. In one embodiment, the reminder application 120 is operable to determine schedule reminders for calendar items stored in the calendar server in association with a particular user's schedule. More specifically, the reminder application 120 may be capable of intelligently scheduling reminders such that they are received by the user at a useful time instead of being received too early, too late, or even not at all.

The database 124 may include any data storage medium capable of maintaining data related to users of the communication endpoints 108, the communication endpoints 108, calendar items, or other important information. The database 124 may include one or more magnetic storage devices, optical storage devices, solid state storage devices, or the like.

The presence awareness server 128 may be provided in addition to the calendar server 116. However, functions of the presence awareness server 128 may be incorporated into the calendar server 116. In one embodiment, the presence awareness server 128 is capable of detecting and monitoring the presence of one or more user's on the communication endpoints 108. The presence awareness server 128 may utilize Session Initiation Protocol (SIP) to track the presence of users on various communication endpoints 108. The presence awareness server 128 may provide presence information to the calendar server 116 upon request by the calendar server 116. Alternatively, the presence awareness server 128 may push presence information to the calendar server 116 whenever the presence of a user is detected.

The term "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the servers 112, 116, user communication endpoints 108, and other elements as shown in FIG. 1 is for purposes of illustration only and should not be construed as limiting the invention to any particular arrangement of elements.

Figure 2:
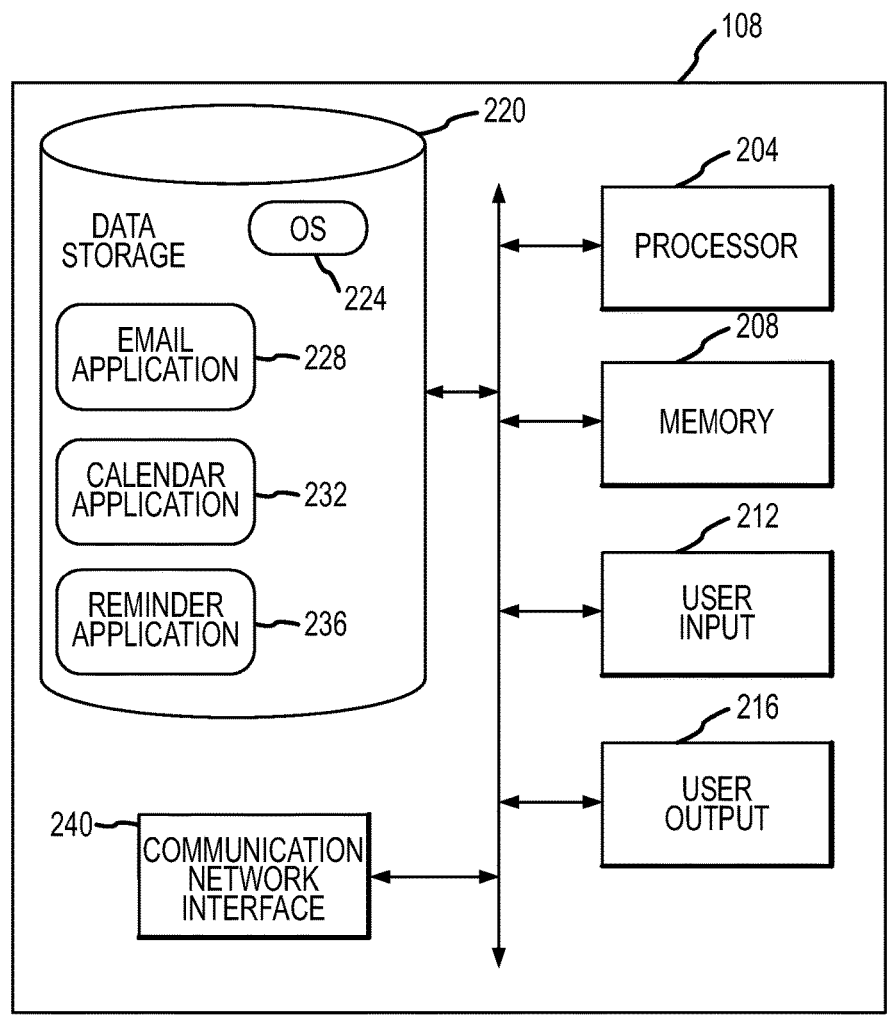
FIG. 2 is a block diagram depicting an exemplary communication endpoint in accordance with embodiments of the present invention.

With reference now to FIG. 2, components of a communication endpoint 108, like a communications or computing device, are depicted in block diagram form in accordance with embodiments of the present invention. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication endpoint 108.

A communication endpoint 108 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, the communication endpoint 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication endpoint 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

Examples of other applications that may be stored in the data storage 220 include an email application 228 that allows the user of the endpoint 108 to view, access, and manipulate data on the email server 112. For example, the email application 228 may provide a user friendly interface that presents data from the email server 112 to the user in an logical fashion, allows the user to create emails for transmission to other users associated with the communication system 100 and further respond to and/or forward emails received from other users. The email application 228 may further allow the user to send calendar items to other users requesting their participation with the calendar item.

Another application that may reside in data storage 220 is a calendar application 232. The calendar application 232 may maintain a personal event calendar and resource availability chart for a user associated with the endpoint 108. The calendar application 232 may be used to view upcoming events or tasks for a particular person or group of people. The email application 228 and calendar application 232 may work cooperatively to schedule calendar items via email with other users of the network 100.

A reminder application 236 may further be included as part of the data storage 220. The reminder application 236 may be operable to analyze and schedule reminders associated with calendar items stored in the calendar application 232. The reminder application 236 may maintain records of availability for a user and may further be able to monitor actions of the user through one or both of the user input 212 and user output 216. Based on the estimated availability of the user to the communication device 108 and the user's schedule, the reminder application 236 can adjust the scheduled time for various reminders of calendar items such that the user receives the reminders early enough for the user to prepare appropriately for the upcoming calendar item.

The data storage 220 may also contain application programming and data used in connection with the performance of other functions of the communication endpoint 108. For example, in connection with a communication endpoint 108 such as a telephone or IP telephone, the data storage 220 may include communication application software. As another example, a communication endpoint 108 such as a Personal Digital Assistant (PDA) or a general purpose computer may include a word processing application in the data storage 220.

A communication endpoint 108 may also include one or more communication network interfaces 240. Examples of communication network interfaces 240 include, but are not limited to, a network interface card, a modem, a wired telephony port, a serial or parallel data port, radio frequency broadcast receiver or other wired or wireless communication network interfaces.

Figure 3A:
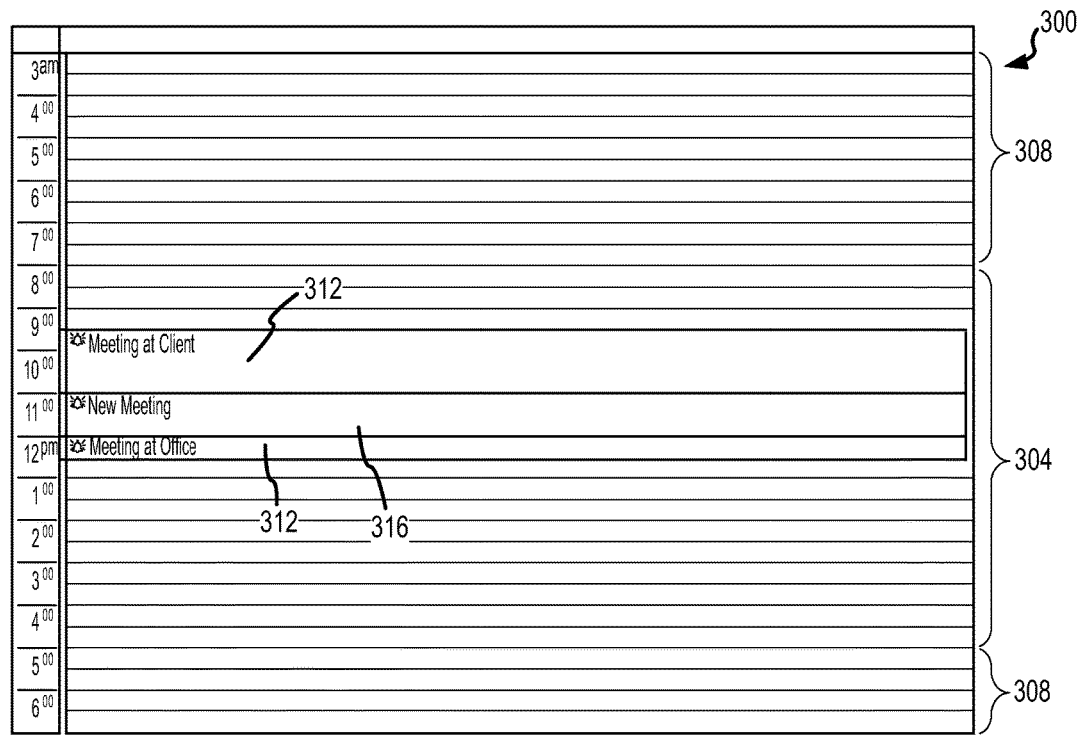
FIG. 3A is a screen shot of a calendar application with a new calendar item in a first position in accordance with embodiments of the present invention.

With reference now to FIGS. 3A-H, screen shots depicting examples of a user's schedule and the preparation of reminders of calendar items contained therein will be described in accordance with at least some embodiments of the present invention. Referring initially to FIG. 3A, a schedule 300 is depicted. The schedule 300 generally corresponds to a particular user's work schedule and thus has working hours 304 and non-working hours 308 defined and shown. As can be appreciated, the schedule 300 does not necessarily need to correspond to a user's work schedule but rather can correspond to any schedule of availability for the user.

The working hours 304 and non-working hours 308 defined in the schedule 300 may correspond to a particular user's availability to the communication endpoint 108. For example, if the communication endpoint 108 is a personal computer at the user's office, then the working hours 304 generally correspond to the user's typical hours that he/she will be in the office. The working hours 304 may be set to a default value (e.g., between 8:00 am and 5:00 pm) corresponding to an average work week. The default working hours 304 may be changed either manually by the user or through observation of the user's interaction with the communication device 108 by the reminder application 236. The reminder application 236 can track the historical records of when a user interacts with the user input 212 to redefine default values of working hours 304. For example, if the reminder application 236 determines that the user typically begins interacting with the communication device 108 (e.g., the user logs on to the communication device 108) at around 7:00 am and stops interacting with the communication device 108 around 6:00 pm, then the reminder application 236 may decide to adjust the working hours 304 to encompass the time between 7:00 am and 6:00 pm. Additionally, if the reminder application 236 notices a general stoppage of interaction between around 12:00 pm and 1:00 pm (e.g., because the user goes to lunch), then the reminder application 236 may conclude that the time between 12:00 pm and 1:00 pm corresponds to non-working time 308 and may redefine working hours 304 accordingly. Other known presence tracking mechanisms may be employed by the reminder application 236, such as Session Initiation Protocol (SIP) presence tracking, to help more accurately redefine working hours 304 versus non-working hours 308. As can be appreciated, working hours 304 may be the same for all days of the week or may vary from day to day depending upon the user's habits.

The non-working hours 308 may be considered herein as calendar items in that they represent a time in which the user will not likely receive a reminder. Other calendar items that may be included as part of the schedule 300 include the meetings/appointments 312. The meetings 312 are calendar items that are present in the schedule 300 when a new calendar item 316 is added to the schedule 300. In the example depicted by FIG. 3A, the first existing meeting 312 is scheduled to begin at 9:30 am and end at 11:00 am. The second existing meeting 312 is schedule to begin at 12:00 pm and end at 12:30 pm. When the next calendar item 316 is added via the calendar application 232, the reminder application 236 analyzes the placement of the new calendar item 316 relative to the existing meetings 312. The new calendar item 316 is scheduled to begin at 11:00 am and end at 12:00 pm. In this particular situation the scheduled ending of the first existing meeting 312 immediately precedes the scheduled beginning of the new calendar item 316. Additionally, the scheduled ending of the new calendar item 316 immediately precedes the scheduled beginning of the second existing meeting 312. Thus, in the given scenario, the new calendar item 316 is immediately preceded and succeeded by other calendar items. The reminder application 316 is operable to determine that such a situation exists and can accordingly reschedule reminders for the existing meetings 312 as well as intelligently schedule the reminder for the new calendar item 316.

Figure 3B:
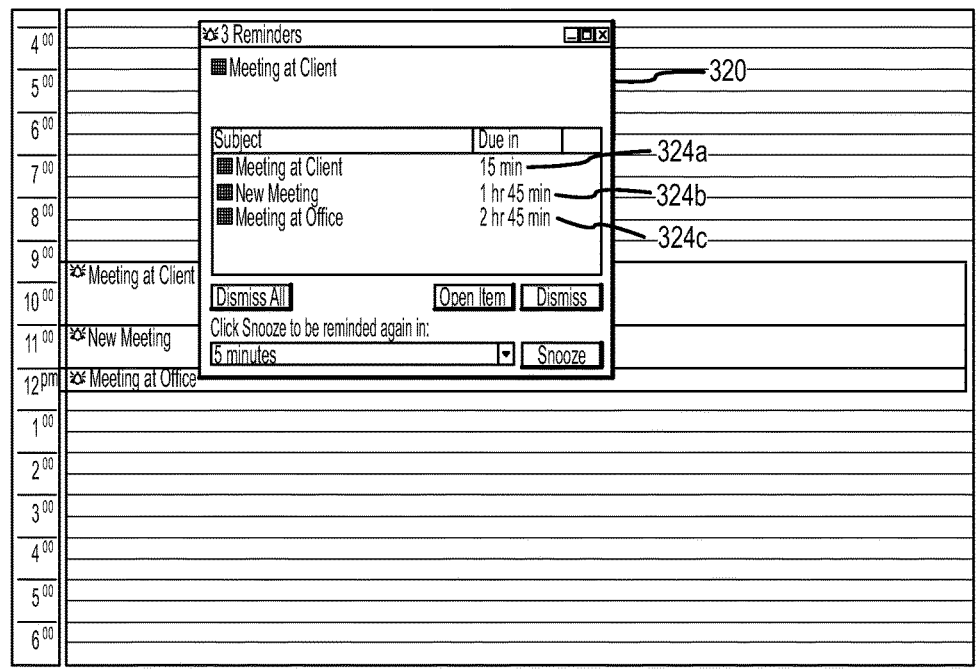
FIG. 3B is a screen shot of a calendar application with a first reminder in accordance with embodiments of the present invention.

In one embodiment, such as that depicted in FIG. 3A, when the addition of a calendar item results in "back-to-back" calendar items (i.e., one calendar item substantially immediately precedes or succeeds another calendar item), the reminder application 236 can merge reminders for the calendar items into a single reminder. As can be seen in FIG. 3B, the scheduled time for the merged reminder 320 to occur may correspond to a predetermined time before a first of the back-to-back meetings. This way if the user has a block of meetings that require different types of preparation for each meeting, then the user can be reminded of each meeting before it is too late to prepare. As can be seen in FIG. 3B, when the scheduled time for the reminder is reached, the merged reminder 320 may be provided to the user. The merged reminder 320 may include a first reminder message 324a for the first existing meeting 312, a second reminder message 324b for the second new calendar item 316, and a third reminder message 324c for the second existing meeting 312. Certain features provided with current reminders may be incorporated in the merged reminder 320 such as options to delay or dismiss a particular reminder. The reminder messages 324 may also include description information for the calendar items 312, 316. For example, the reminder messages 324 may include the location for the calendar item, resources required for the calendar item, invitees to the calendar item, and the amount of time until the scheduled beginning of the calendar item. The merged reminder 320 may be provided to the user visually and/or audibly depending upon the user output 216.

Figure 3C:
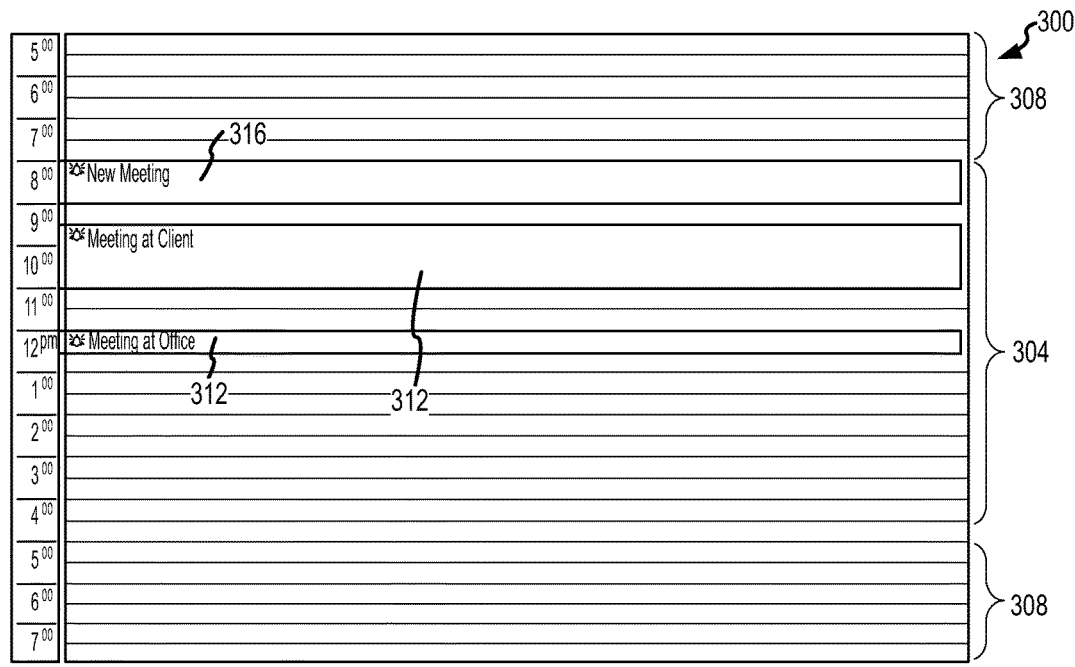
FIG. 3C is a screen shot of a calendar application with a new calendar item in a second position in accordance with embodiments of the present invention.
Figure 3D:
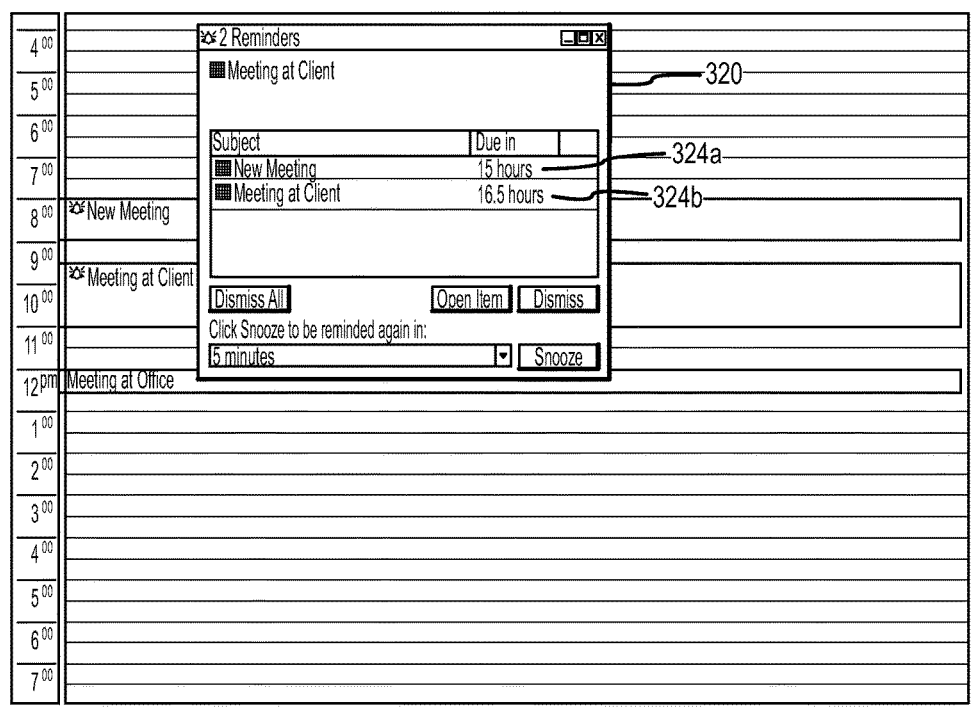
FIG. 3D is a screen shot of a calendar application with a second reminder in accordance with embodiments of the present invention.

With reference now to FIGS. 3C and 3D, an alternative scheduling configuration is depicted in accordance with at least some embodiments of the present invention. In this alternative configuration the new calendar item 316 is not scheduled between the first and second existing meetings 312. Rather, the new calendar item 316 is scheduled at the beginning of the work hours 304. In other words, the scheduled beginning of the new calendar item 316 immediately succeeds the scheduled end of non-working hours 308 (which is also referred to as a calendar item). Since the new calendar item 316 is back-to-back with the calendar item represented by non-working hours 308, the reminder for the new calendar item 316 may be scheduled to occur prior to the beginning of the preceding non-working hours 308. Stated another way, the reminder for the new calendar item 316 may be scheduled to occur during working hours 304 of the previous working day. Therefore, if the new calendar item 316 is scheduled for a Monday or a day following a holiday, then the reminder for that calendar item may be scheduled for the preceding Friday or the day before the holiday.

In the schedule configuration depicted in FIGS. 3C and 3D there is thirty minutes between the scheduled end of the new calendar item 316 and the first existing calendar item 312. If the first existing meeting 312 (i.e., the succeeding calendar item) is set to occur at the same location as the new calendar item, requires the same resources (e.g., projectors, computers, files, etc.) as the new calendar item 316, and does not require a great deal of preparation prior to the meeting, then separate reminders for the new calendar item 316 and the first existing meeting 312 can be maintained. However, if one of those situations is not true (i.e., thirty minutes of reminder time is not sufficient to properly remind the user of the first existing meeting 312), and the user will likely need to be reminded of the first existing meeting 312 prior to the beginning of the new calendar item 316, then the reminder for the first existing meeting 312 can be merged with the reminder for the new calendar item 316. Moreover, the merged reminder 320 can be presented to the user during the working hours 304 preceding the non-working hours 308 before the new calendar item 316. As can be appreciated, the calendar item corresponding to non-working hours 308 usually does not require a reminder message or the like and thus does not need to have a reminder associated therewith.

Figure 3E:
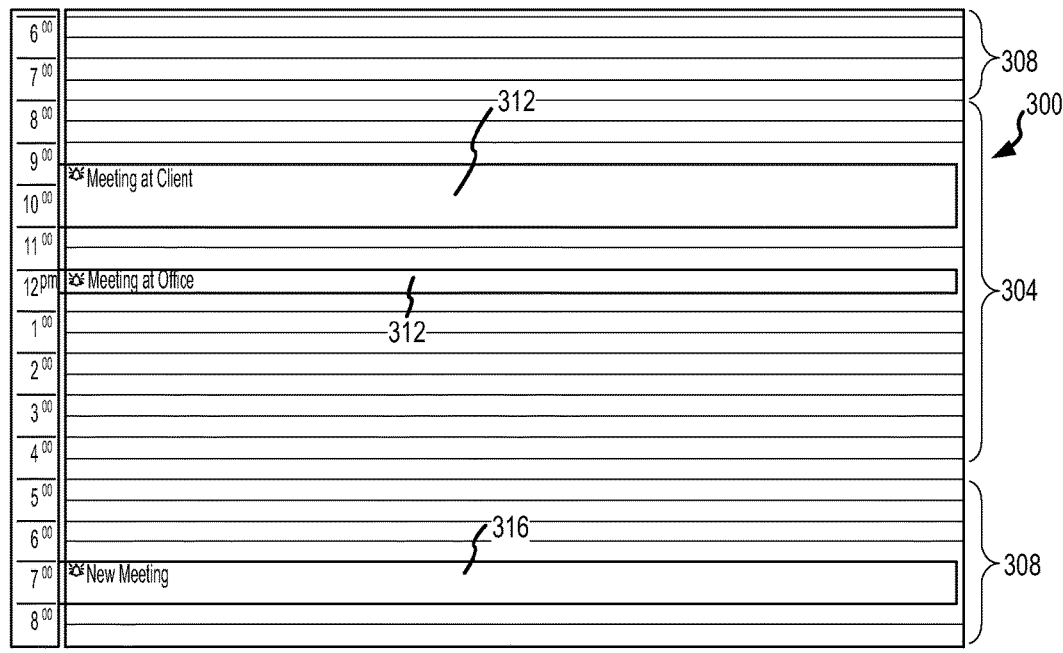
FIG. 3E is a screen shot of a calendar application with a new calendar item in a third position in accordance with embodiments of the present invention.
Figure 3F:
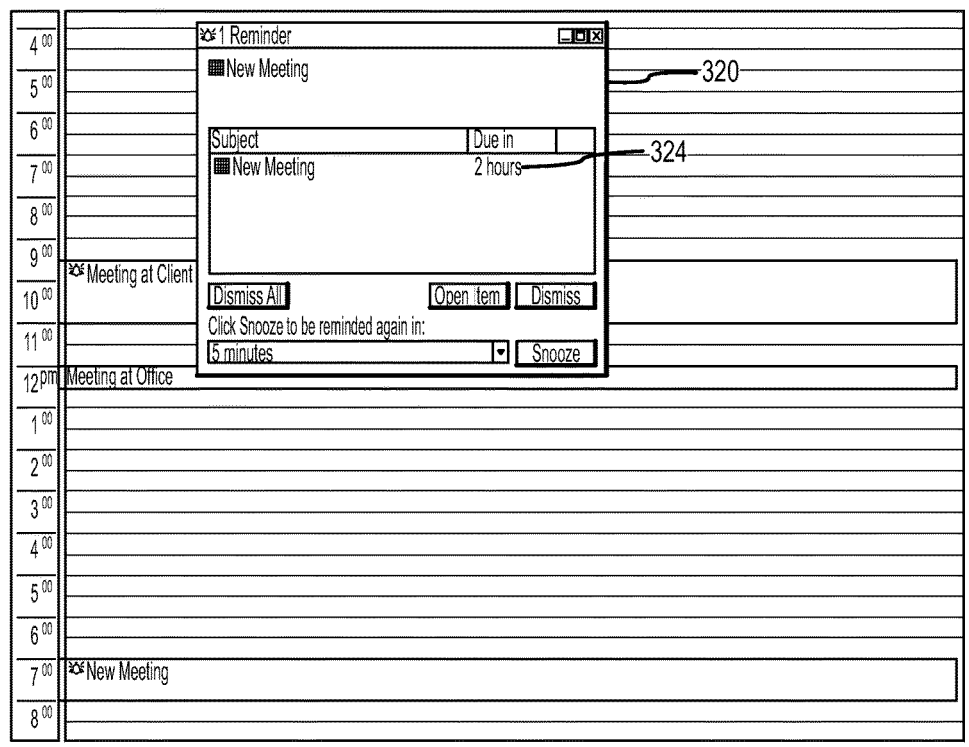
FIG. 3F is a screen shot of a calendar application with a third reminder in accordance with embodiments of the present invention.

Referring now to FIGS. 3E and 3F a third possible configuration of a schedule 300 will be described in accordance with at least some embodiments of the present invention. The new calendar item 316 has been scheduled during non-working hours 308 in the depicted embodiment. Since the new calendar item 316 is immediately preceded and succeeded by a calendar item (i.e., non-working hours 308), then it may be necessary to remind the user of the new calendar item 316 prior to the scheduled beginning of the non-working time 308. Of course, in an alternative embodiment, a reminder 320 for the new calendar item can be dynamically scheduled based on actions performed by the user. For example, the reminder 320 can be scheduled to occur whenever the reminder application 236 detects that the user is going to soon leave the presence of the communication endpoint 108. This detection can occur when the user engages a command to "log off" or attempts to turn off the communication endpoint 108. If the reminder application 236 detects such a action then it may generate the reminder 320 for the new calendar item 316 and provide the reminder message 324 to the user before he/she leaves the presence of the communication device 108. However, if the reminder application 236 does not detect such an event and the user stays actively engaged with the communication device 108, then default reminder times can be used to remind the user about the new calendar item 316. The reminder application 236 should be flexible enough to provide reminders early enough to a user such that they are useful but not too early that they will be forgotten prior to the scheduled beginning of the calendar item.

Figure 3G:
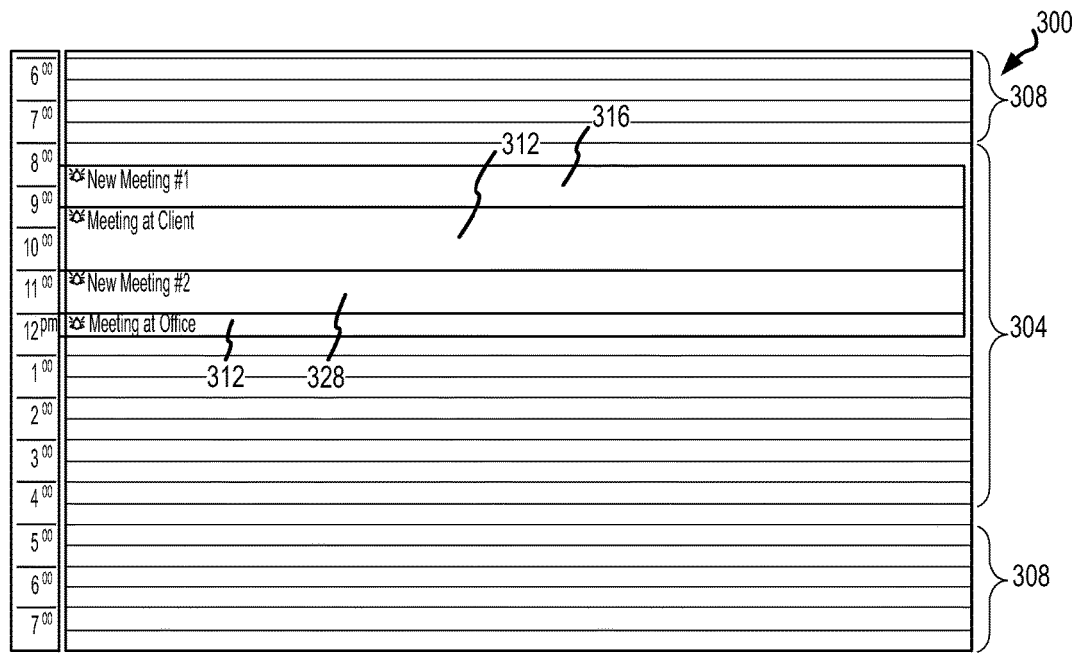
FIG. 3G is a screen shot of a calendar application with a two new calendar items in accordance with embodiments of the present invention.
Figure 3H:
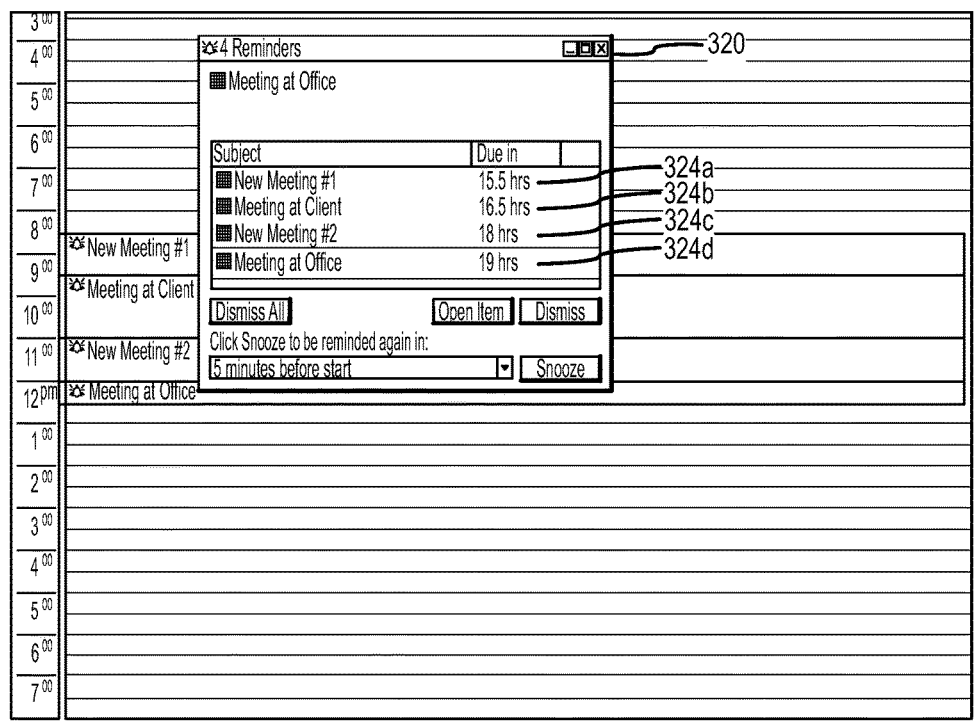
FIG. 3H is a screen shot of a calendar application with a fourth reminder in accordance with embodiments of the present invention.

With reference now to FIGS. 3G and 3H, another possible configuration of the schedule 300 will be described in accordance with at least some embodiments of the present invention. The new calendar item 316 is scheduled to occur prior to the first existing meeting 312 and a second new calendar item 328 is scheduled to occur between the first and second existing meeting 312. Now a situation exists where multiple back-to-back calendar items exist. In this particular configuration, since each calendar item is scheduled to substantially immediately precede the next calendar item, all of the reminder messages for the calendar items can be merged into a single reminder 320 having a reminder message 324a-d for each calendar item. The merged reminder 320 may be provided to the user prior to the non-working hours 308 preceding the first new calendar item 316. However, if thirty minutes provides a sufficient amount of time to prepare for all four calendar items, then the merged reminder may not be provided to the user until the working hours 304 in which the calendar items exist. In an alternative embodiment, dynamic scheduling of the merged reminder can be employed for the depicted configuration. More specifically, the reminder may be set to occur when the user "logs on" or turns on the communication device 108. When that event occurs the merged reminder 320 may be provided to the user. This way a dependence upon a certain reminder time becomes unnecessary.

Figure 4:
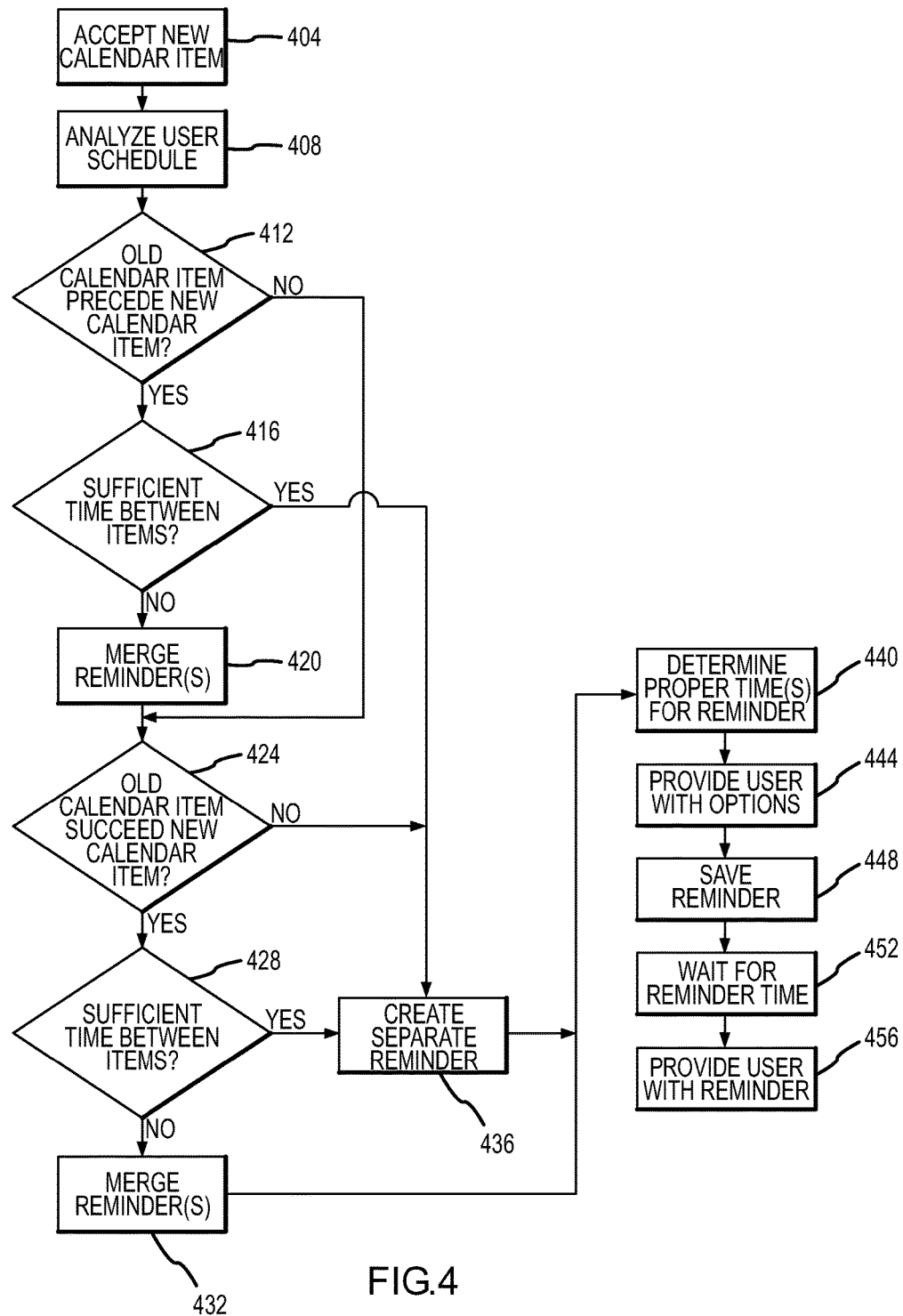
FIG. 4 is a flow chart depicting a method of generating a new calendar item and calendar item reminder in accordance with embodiments of the present invention.

Referring now to FIG. 4, a method of adding a new calendar item to a schedule 300 will be described in accordance with at least some embodiments of the present invention. Initially, the method begins when a new calendar item is accepted or added by a user (step 404). Once the calendar item has been accepted, the user's schedule is analyzed (step 408). In the analyzing step, the reminder application 236 identifies the scheduled beginning and end of the new calendar item and compares those values with scheduled beginnings and endings of other scheduled calendar items. The reminder application 236 also analyzes the current reminder times for calendar items in the schedule to determine if the new calendar item affects any of the reminders (i.e., overlaps with one or more reminder times).

Once the schedule has been analyzed, it is determined if an existing (old) calendar item precedes the new calendar item (step 412). If an existing calendar item precedes the new calendar item, or more specifically precedes the new calendar item within a predetermined threshold (e.g., the existing calendar item is scheduled to end with X amount of time prior to the scheduled beginning of the new calendar item), then it is determined if there is sufficient time between the calendar items to prepare for each calendar item separately (step 416). In this step it is determined whether the existing calendar item substantially immediately precedes the new calendar item. This determination may be based on a number of considerations including, without limitation, whether the calendar items are scheduled to occur at a common location, whether the calendar items require the same resources, how much time the new calendar item will require to get prepared for, and so on. If it is determined that there is not sufficient time between the calendar items to prepare for each separately, then the reminders for both calendar items are merged into a single reminder (step 420). As noted above, the merged reminder may include reminder messages for each calendar item associated with the merged reminder. However, if it is determined that there is a sufficient amount of time available between calendar items to prepare for the new calendar item, then a separate reminder is created for the new calendar item (step 436).

Reverting back to step 412, if it is determined that an existing calendar item does not precede the new calendar item such that a merged reminder would need to be considered, then the method continues to determine if there are any existing calendar items that succeed the new calendar item such that a merged reminder should be considered (step 424). In other words, it is determined if an existing calendar item succeeds the new calendar item within a predetermined threshold (e.g., the new calendar item is scheduled to end with X amount of time prior to the scheduled beginning of the existing calendar item). The method also proceeds to step 424 after any necessary reminders have been merged in step 420. If the question of step 424 is answered affirmatively, then it is determined if there is sufficient time between the new calendar item and the existing calendar item such that the user will have time to prepare for the existing calendar item after the scheduled ending of the new calendar item (step 428). Again, step 428 essentially determines whether or not an existing calendar item substantially immediately succeeds the new calendar item. Insufficient time may exist between calendar items if the scheduled time of the reminder for the existing calendar item coincides with the new calendar item. If there is not sufficient time between the calendar items, then the method continues by merging the reminders into a single merged reminder (step 432). However, if there is sufficient time between calendar items (e.g., the reminder for the existing calendar item was scheduled to occur after the scheduled ending of the new calendar item), then the reminders for each calendar item are maintained separately and a new reminder is created for the new calendar item (step 436).

Once the necessary calendar items have been created, and merged if necessary, the proper time to schedule the reminder is determined (step 440). The proper time may correspond to a default amount of time (e.g., fifteen minutes) before the scheduled beginning of the first calendar item. Alternatively, the proper time may be based on actions of the user in connection with the communication endpoint 108. The user may be provided with options for managing the reminders based on the schedule and the reminder application's 236 best guess at suitable times for an early enough reminder (step 444). For example, the reminder application 236 may query the user to see if he/she would like to have the reminder for the new calendar item remain in a merged reminder. The reminder application 236 may also query the user to see if it is allowable to schedule the reminder for the day before the scheduled beginning of the calendar item. If the user knows they will be in the office earlier than usual, then the user may decide not to have the reminder occur the day before and would prefer to have the reminder, whether merged or not, occur on the same day as the calendar item. Prompting the user is useful because there may be instances where the user's schedule will change from the ordinary schedule, especially depending upon the types of calendar items scheduled therein. The user is allowed to choose the reminder time suggested by the reminder application 236 or may alter it according to his/her preferences. Once the user has decided on a reminder time, the reminder is saved in association with the calendar item (step 448).

The reminder application 236 will then wait until it is the scheduled time for the reminder (step 452). When the schedule time is reached the reminder application 236 will generate the reminder based on the specifications of the reminder. For example, if a single message is to be generated as a part of the reminder, then the reminder application 236 generates the reminder containing the single message. If more reminder messages were merged into the reminder, then the reminder application 236 will add those messages to the reminder. The messages may be included in the merged reminder or pointers may be employed by the merged reminder to reference each message that is a part of the merged reminder. The generated reminder is then provided to the user, thus giving the user the required reminders for upcoming calendar items (step 456).

Figure 5:
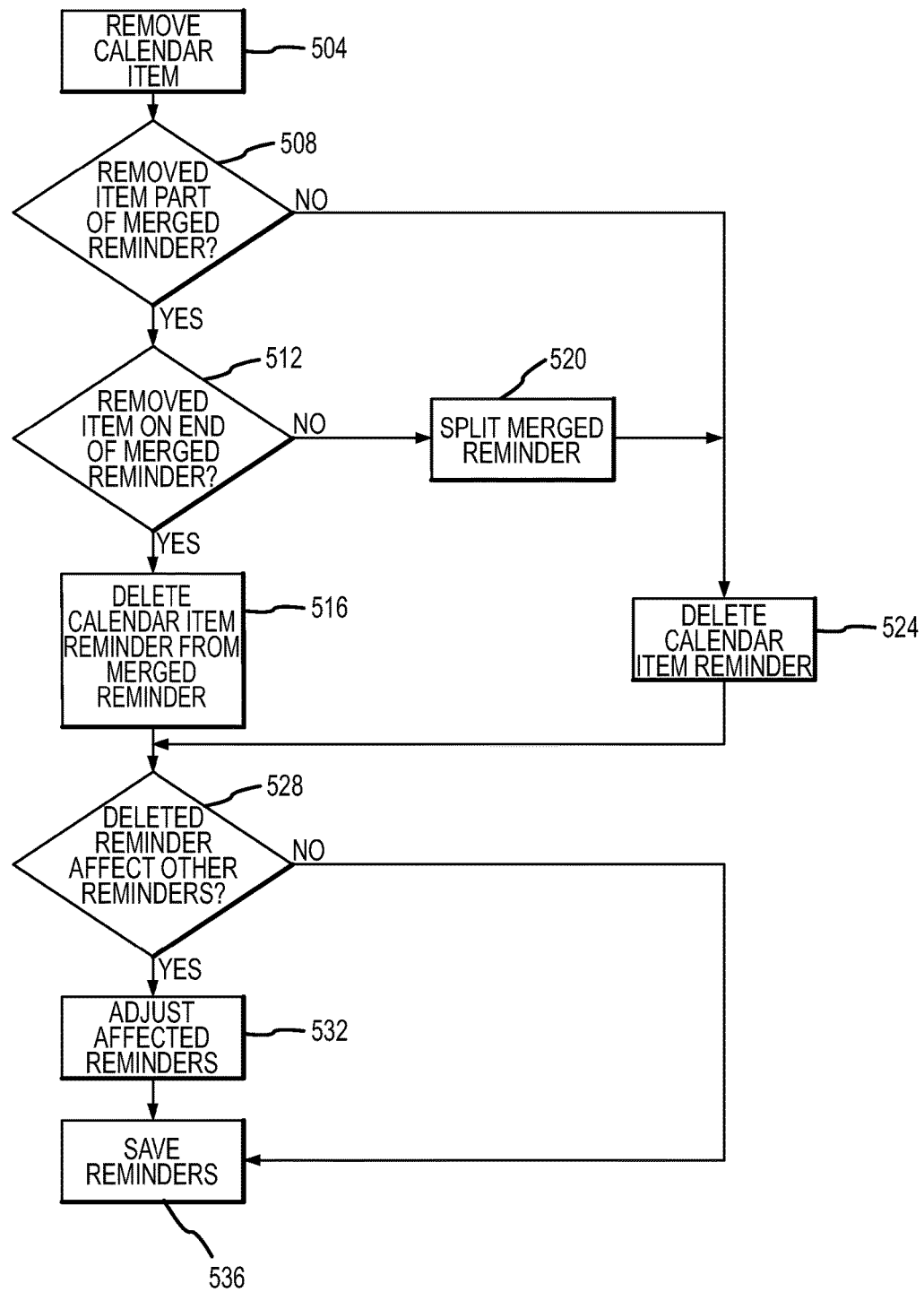
FIG. 5 is a flow chart depicting a method of managing the removal of a calendar item in accordance with embodiments of the present invention.

FIG. 5 depicts a method of removing a calendar item from a schedule in accordance with at least some embodiments of the present invention. Initially, the method begins when a calendar item is removed from a schedule (step 504). When a calendar item is removed, the reminder application 236 determines if the removed item had a reminder message that was a part of a merged reminder (step 508). In the event that the removed calendar item had its reminder included in a merged reminder, the reminder application further determines if the removed reminder is located at an extremity of the calendar items that also have their reminders included in the merged reminder (step 512). In other words, the reminder application 236 determines if the removed calendar item was the first or last in a series of back-to-back calendar items that all had their reminders included in the merged reminder. If the removed calendar item was actually the first or last in the series of calendar items, then the reminder message for the removed calendar item is deleted from the merged reminder (step 516). However, in the event that the removed calendar item was in the middle of a series of back-to-back calendar items, then the merged reminder is split into two different merged reminders (step 520). The first merged reminder includes messages for any calendar items that preceded the removed calendar item and the second merged reminder include messages for any calendar items that succeeded the removed calendar item. Of course, the first and/or second merged reminder may only include one reminder message after the other calendar item is removed. Once the merged reminder has been split, or the removed calendar item was never a part of a merged reminder, then the reminder message for the removed calendar item is deleted (step 524).

After the reminder message for the removed calendar item has been deleted, the reminder application 236 analyzes the new schedule to determine if any other reminder times have been affected by the removal of the calendar item (step 528). The reminder application 236 may analyze the times between the previously merged, now separated reminders, to see if there is sufficient time between the reminders to maintain them separately. If the reminder application 236 determines that there is not a sufficient amount of time between calendar items belonging to each of the separated reminders, then the separated reminders may be remerged. For example, if the removed calendar item only corresponded to a ten-minute meeting, then it will be likely that the calendar items surrounding the removed calendar item will still require a merged reminder. The reminder application 236 may also check other portions of the schedule to determine if any other reminders need to be rescheduled based on the removed calendar item.

In the event that the reminder application 236 determines that no changes are necessary, then the reminders are saved and stored by the reminder application 236 (step 536). However, in the event that the reminder application 236 determines that some other reminders need to be adjusted based on the removal of the other calendar item, then the affected reminders are adjusted (step 532). This particular step may be performed entirely by the reminder application 236 or may include assistance from the user. For example, the reminder application 236 may query the user when it has certain suggestions for reminder rescheduling.

Figure 6:
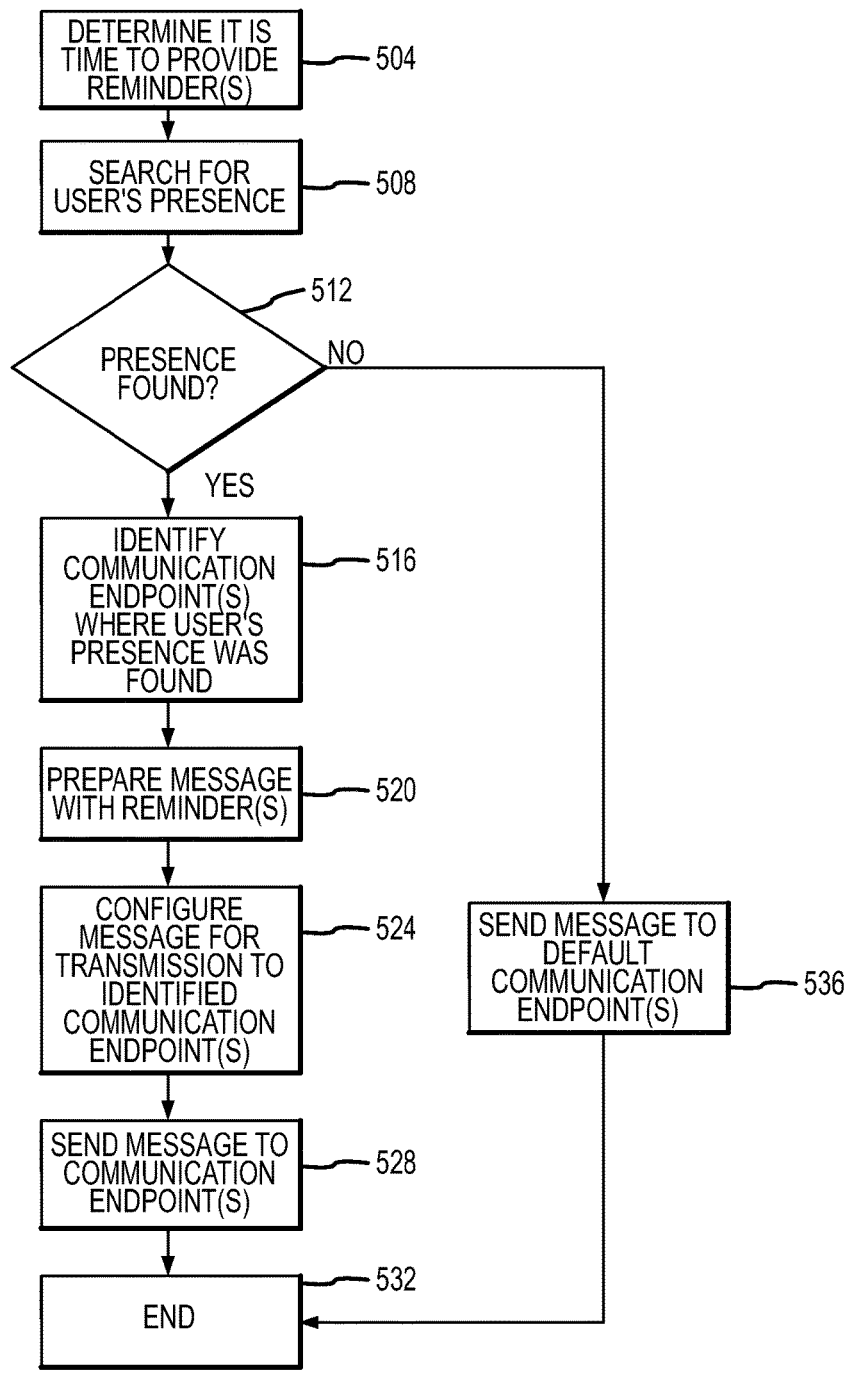
FIG. 6 is a flow chart depicting a method of utilizing presence information to provide an early enough reminder in accordance with embodiments of the present invention.

FIG. 6 depicts a method of utilizing presence information to provide an early enough reminder in accordance with at least some embodiments of the present invention. Initially, the method begins when it is determined that it is time to provide a reminder or merged reminder having a number of reminders to a user (step 504). When the reminder application 120, 236 determines that it is time to provide a reminder to the user, the reminder application 120, 236 may request presence information from the presence awareness server 128. Upon receiving such a request, the presence awareness server 128 can search for the user's presence (step 508). The presence awareness server 128 typically maintains a database of user's presence. The presence awareness server 128 can access the presence database to determine if the presence of the user is detected. Alternatively, upon receiving a request to search for a user's presence, the presence awareness server 128 may check all communication endpoints 108 to see if the user has a presence with one of the communication endpoints 108. In still a further alternative embodiment, the presence awareness server 128 may continually provide presence information to the database 124 for the calendar server 116 to access when desired.

In step 512, it is determined if the presence of the user was found. In the event that the presence of the user was found or detected on at least one communication endpoint 108, the communication endpoint(s) 108 are identified (step 516). The presence of the user may have been detected on a computer, for example, or a cellular phone. After the communication endpoint(s) 108 have been identified, the reminder application 120 is used to prepare a message containing the reminder(s) for the calendar item(s) (step 520). The message may contain a single reminder, a number of reminder, and/or merged reminders. The message is then configures for transmission to the identified communication endpoint(s) 108 (step 524). For example, if the presence of the user was detected on an instant messaging (IM) application, then an instant message may be prepared for transmission to the user. If the presence of the user was detected on a cellular phone, then a SMS message may be prepared for transmission to the cellular phone. If the presence of the user was detected on an email application, then an email reminder may be provided to the user. As can be appreciated, a single message or multiple messages may be prepared depending upon the number and type of communication endpoint(s) 108 that are detected with a presence of the user.

Once the message(s) has been configured for transmission, the messages are sent to the respective communication endpoint(s) (step 528). The transmission of multiple messages may help to ensure that the user timely receives the reminder before the scheduled calendar item. After the message(s) has been sent, the method ends at step 532.

Referring back to step 512, in the event that the presence of the user is not found, or if a presence awareness server 128 is not employed, then the message containing the reminder(s) is sent to the default communication endpoint 108 (step 536). The default communication endpoint 108 may be the communication endpoint 108 most used by the user or the communication endpoint 108 having the calendar application 232.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method executed by at least one processor associated with at least one of a communication endpoint and server, comprising:

creating, with a calendar application executed by the processor associated with the at least one of the communication endpoint and server, a first calendar item for a user;

analyzing, with a reminder application executed by the processor associated with the at least one of a communication endpoint and server, a schedule associated with the user, to determine if at least a second calendar item and the first calendar item are within temporal proximity;

if at least a second calendar item and the first calendar item are within temporal proximity, determining, with the reminder application executed by the processor, whether the at least a second calendar item precedes the first calendar item by less than a predetermined amount of time, thereby creating a sequence of calendar items;

in the event that the at least a second calendar item precedes the first calendar item by less than a predetermined amount of time, utilizing the reminder application executed by the processor to at least one of (i) provide the user with an option of merging reminders for the first and the at least a second calendar item, using the processor, such that the merged reminder is provided to the user prior to a scheduled beginning of the at least a second calendar item and (ii) automatically schedule a first reminder for the first calendar item prior to the scheduled beginning of the at least a second calendar item and based on a start time of the at least a second calendar item;

acquiring presence information for the user;

determining, from the acquired presence information, a modality of communication to use in providing the user with the first reminder and a second reminder for the at least a second calendar item;

preparing a message for the user that includes the first and second reminders; and sending the message to the user via the determined modality of communication.

2. The method of claim 1, wherein the first and the at least a second calendar item create a non-overlapping sequence of calendar items, wherein the at least a second calendar item precedes the first calendar item by less than a predetermined amount of time, the method further comprising:

receiving a confirmation from the user to schedule the first reminder prior to the at least a second calendar item; and merging the first reminder with the second reminder for the at least a second calendar item, wherein the merged reminder is scheduled to be provided to the user prior to the scheduled beginning of the at least a second calendar item.

3. The method of claim 2, further comprising:

waiting for a scheduled time for the second reminder, wherein the scheduled time corresponds to a default time for providing the second reminder and wherein the scheduled time is before the beginning of the at least a second calendar item; and at the scheduled time, providing the user with the first and second reminder.

4. The method of claim 1, wherein the determining step comprises:

determining that a location of the at least a second calendar item is different from a location of the first calendar item; and determining that the first calendar item requires at least one resource that the at least a second calendar item does not require.

5. The method of claim 1, wherein the at least a second calendar item comprises an extended period during which the user will not be able to receive a reminder.

6. The method of claim 1, further comprising:

determining whether at least a third calendar item succeeds the first calendar item by less than a predetermined amount of time; and in the event that at least a third calendar item succeeds the first calendar item by less than a predetermined amount of time, providing the user with an option of scheduling a third reminder for the at least a third calendar item prior to a scheduled beginning of the first calendar item.

7. The method of claim 6, wherein the at least a third calendar item succeeds the first calendar item by less than a predetermined amount of time, the method further comprising:

receiving a confirmation from the user to schedule the third reminder prior to the first calendar item; and merging the third reminder with the first reminder, wherein the merged reminder is scheduled to be provided to the user prior to the scheduled beginning of the first calendar item.

8. The method of claim 7, wherein the at least a second calendar item precedes the first calendar item by less than a predetermined amount of time, the method further comprising:

merging the first and third reminders with the second reminder for the at least a second calendar item, wherein the merged reminder is scheduled to be provided to the user prior to the scheduled beginning of the at least a second calendar item and the scheduled beginning of the first calendar item.

9. The method of claim 8, further comprising:

waiting for a scheduled time for the second reminder, the scheduled time corresponding to a predetermined amount of time prior to the scheduled beginning of the at least a second calendar item; and at the scheduled time, providing the user with the first, second, and third reminders.

10. The method of claim 1, wherein the first and the at least a second calendar item comprise at least one of a meeting, an event, a task, non-working hours, a holiday, a weekend, and a break.

11. A system for managing schedules, comprising:

a processor associated with at least one of a communication endpoint and server, the processor configured to execute:

a calendar application in which a first calendar item is created and stored in a schedule associated with a user; and a reminder application configured to analyze the schedule to determine if at least a second calendar item and the first calendar item are within temporal proximity, determine whether the at least a second calendar item precedes the first calendar item by less than a predetermined amount of time, and, in the event that the at least a second calendar item precedes the first calendar item by less than a predetermined amount of time, schedule a first reminder for the first calendar item prior to a scheduled beginning of the at least a second calendar item and based on a start time of the at least a second calendar item; and a presence awareness server configured to identify a presence of the user on at least one communication device and cause the first reminder and a second reminder for the second calendar item to be provided to the user on the at least one communication device.

12. The system of claim 11, wherein the first and the at least a second calendar item create a non-overlapping sequence of calendar items, wherein the reminder application determines that the at least a second calendar item precedes the first calendar item by less than a predetermined amount of time and merges the first reminder with the second reminder for the at least a second calendar item, wherein the merged reminder is scheduled to be provided to the user prior to a scheduled beginning of the at least a second calendar item.

13. The system of claim 12, wherein the reminder application is further configured to wait for a scheduled time for the second reminder and provide the user with the first and second reminder at the scheduled time.

14. The system of claim 11, wherein the reminder application is further configured to determine the following in connection with making a decision to create a merged reminder:
that a location of the at least a second calendar item is different from a location of the first calendar item; and
that the first calendar item requires at least one resource that the at least a second calendar item does not require.

15. The system of claim 11, wherein the at least a second calendar item comprises an extended period of time during which the user will not be able to receive a reminder.

16. The system of claim 11, wherein the reminder application is further configured to determine whether at least a third calendar item succeeds the first calendar item by less than a predetermined amount of time and, in the event that at least a third calendar succeeds the first calendar item by less than a predetermined amount of time, schedule a third reminder for the at least a third calendar item prior to a scheduled beginning of the first calendar item.

17. The system of claim 16, wherein the reminder application determines that the at least a third calendar item succeeds the first calendar item by less than a predetermined amount of time and merges the third reminder with the first reminder, wherein the merged reminder is scheduled to be provided to the user prior to a scheduled beginning of the first calendar item.

18. The system of claim 17, wherein the reminder application determines that the at least a second calendar item precedes the first calendar item by a predetermined amount of time and merges the first and third reminders with the second reminder for the at least a second calendar item.

19. The system of claim 11, wherein the first and the at least a second calendar item comprise at least one of a meeting, an event, a task, non-working hours, a holiday, a weekend, and a break.

* * * * *